United States Patent Office 3,404,764
Patented Oct. 8, 1968

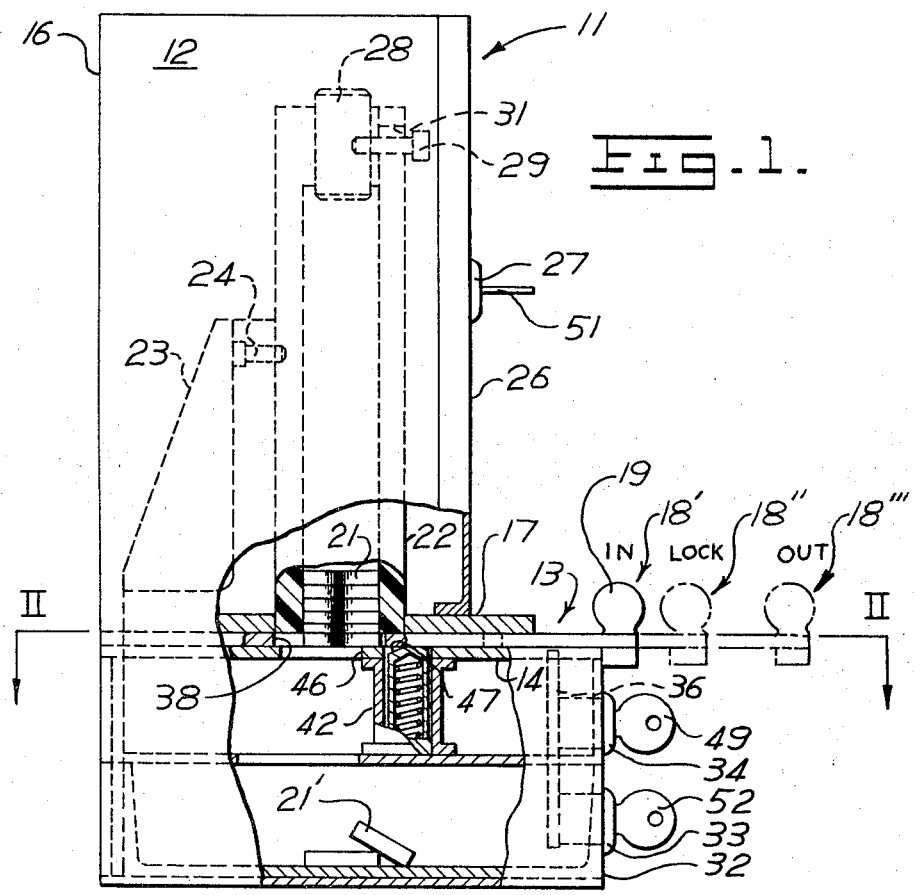
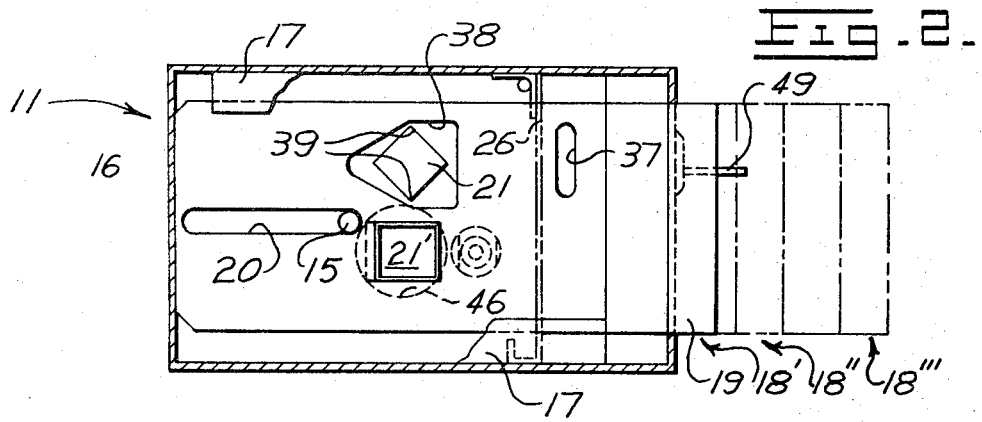

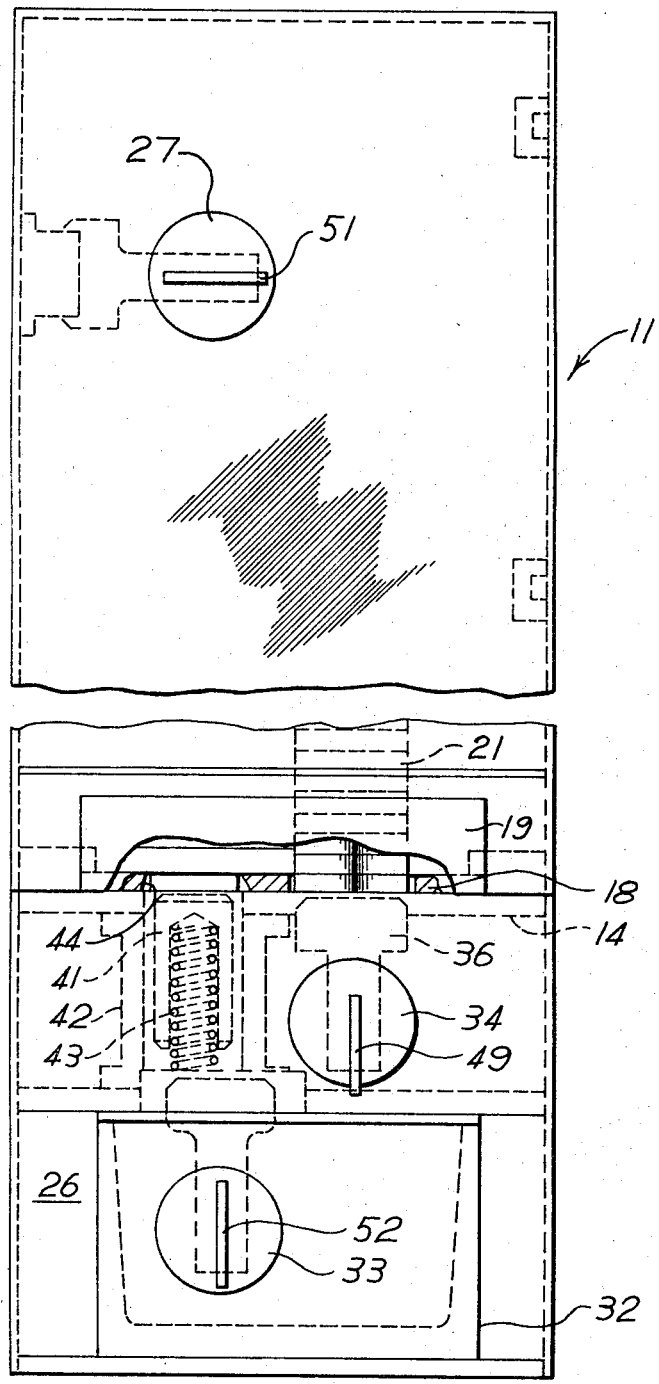

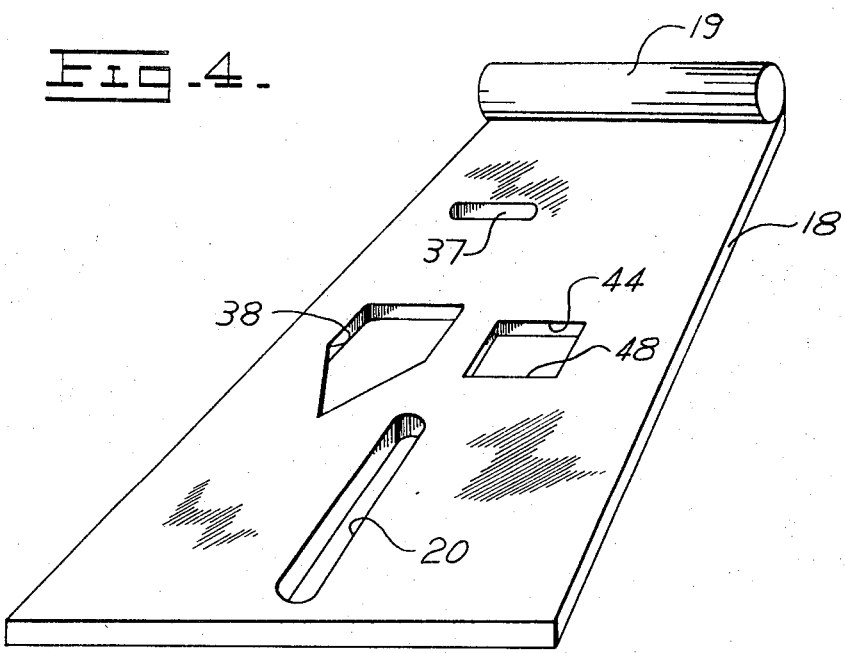

3,404,764
EXCHANGING DISPENSER FOR ARTICLES
WHEREIN A REPLACEMENT ARTICLE
DISPENSES A SIMILAR ARTICLE
Charles E. Lipp, Peoria and Charles R. Wilson and Glenn
F. Betzelberger, Pekin, Ill., assignors to Caterpillar
Tractor Co., Peoria, Ill., a corporation of California
Filed Sept. 8, 1966, Ser. No. 577,890
3 Claims. (Cl. 194—4)

ABSTRACT OF THE DISCLOSURE

A dispenser for small articles such as tool inserts requires the return of a used similar item before a replacement article can be obtained. The stored articles are released from the dispenser by operating a carrier plate, which has an opening for receiving the returned article, and in the absence of a returned article a detent enters the opening to block the necessary carrier motion.

---

This invention relates to devices for storing and dispensing objects and more particularly to a dispenser which requires the return of an article in order to dispense a similar article.

Many articles are distributed to users under the condition that a used article be returned for each replacement obtained. This may be done where the object has a substantial salvage value or as a means of insuring that the item is not issued in excess of needs. A typical example occurs in connection with industrial machine tool operations where small expensive tool inserts are used. To avoid excessive costs the machine operators are generally required to return a used insert for each new one issued. This requirement has been found to be very difficult to enforce in many practical situations.

Various procedures have been tried for the purpose of limiting the issue of new tool inserts to replacement needs but have not generally been successful. Typically the replacement inserts are kept in the custody of a tool crib attendant who is jointly responsible with the line foreman for limiting the release of inserts to each employee's immediate needs. The machinist may fill out a requisition slip which is countersigned by his foreman and subsequently taken to the crib attendant who receives the worn inserts and issues new ones. This procedure, like any other using approval forms, is open to abuses.

The quantity number on an approved form can readily be altered. In other instances workmen may induce a crib attendant to issue more inserts than have been authorized on the form. The motivation for these practices is not necessarily one of deliberate pilferage. Due to the irregularities in the dispensing of inserts under present procedures, occasional shortages occur. Workers are therefore tempted to try to obtain an excessive reserve supply which action itself further aggravates the situation.

In practice, the dispensing of tool inserts has fairly consistently been found to exceed requirements. This not only adds to production costs but may interfere seriously with accurate cost accounting for specific jobs. Essentially similar problems are found in other industrial operations and elsewhere in connection with the dispensing and control of replacement articles.

Thus a need exists for a simple and convenient positive check on the dispensing of small objects and preferably one susceptible to control by a particular individual, such as the line forman discussed above, who is best able to exercise responsibility therefor. The present invention embodies such a system in a mechanical structure in the form of a dispenser which can only be operated by returning a number of objects equal to the number withdrawn and which may require, in addition, positive action on the part of a designated supervisory individual.

Accordingly it is an object of this invention to provide a more reliable control over the dispensing of replacement articles.

It is another object of the invention to provide apparatus for storing and dispensing articles which recovers a number of old articles equal to the number of new articles released.

It is still a further object of this invention to provide a dispensing mechanism which requires the return of a used article for each new article released and which further requires a concurrent action by a specific supervisory individual.

The invention, together with further objects and advantages thereof, will best be understood by reference to the accompanying drawings of which:

FIG. 1 is a side elevation view of a tool insert dispenser with a portion of the side wall thereof cut away to show internal elements of the mechanism;

FIG. 2 is a plan section view of the dispenser taken along line II—II of FIG. 1 further illustrating the structure of the dispenser;

FIG. 3 is a foreshortened front elevation view of the dispenser with a portion thereof broken out; and FIG. 4. is a perspective view of a movable slide of the dispenser shown detached from the remainder of the mechanism in order to better illustrate the configuration of the slide.

Referring now to the drawing and more particularly to FIGS. 1 and 2 in conjunction, the dispenser 11 has an essentially rectangular housing 12 with the lower portion thereof extending forward to form a step 13 at the front face. The shelf 14, which forms the upper surface of step 13, extends back within the housing 12 to the rearwall 16 thereof. A pair of guides 17 extend along opposite sides of the shelf 14 to hold a slidable rectangular carrier plate 18 thereon. Carrier plate 18 has an end which projects forwardly from the housing 12 and which is provided with a handle 19 to facilitate manual movement of the carrier between an inner position 18', an intermediate position 18", and an outer position 18''', in order to operate the dispenser as will hereinafter be described. To further guide movement of the carrier 18a fixed pin 15 extends through a longitudinal slot 20 in the carrier.

The articles to be dispensed, which in this example are flat rectangular tool inserts 21, are stacked in a vertical column within an upright magazine tubulation 22 situated within the upper portion of the housing 12 to one side of the center thereof, with the open lower end of the magazine being immediately above the sliding carrier plate 18. Magazine 22 is supported by a brace 23 and a threaded adjustment stud 24.

To provide for access to the magazine 22 a hinged door 26 is situated at the forward face of housing 12 and provided with a key lock 27. To insure that the inserts 21 move downward within the magazine 22 as units are removed from the bottom thereof, a cylindrical weight 28 is disposed within the magazine above the column of inserts to exert a downward force thereon. It has been found to be advantageous to provide a pin 29 projecting forwardly from the weight 28 through a vertical slot 31 in the magazine for indicating the quantity of inserts 21 therein.

To receive returned inserts 21', a rectangular tray 32 is disposed within the base of housing 12 below the carrier 18. Tray 32 is held in the housing 12 by a second key lock 33 and may be removed for recovering the returned inserts 21' by disengaging the lock.

The release of a replacement insert 21 from magazine 22 and the concurrent return of a used insert 21' is effected by manipulation of the carrier 18. The carrier 18 is normally held at its intermediate position 18'' by a third key lock 34 which is situated at the lower front face of housing 12 and which has a bolt 36 that enters a slot 37 in the carrier. Upon disengagement of the lock 34, the carrier may be moved towards its inner position 18' at which an opening 38 through the carrier is situated directly below the magazine 22. Carrier plate 18 has a thickness approximately the same as that of the inserts 21 so that at the inner position 18' of the carrier a single replacement insert drops into the carrier opening 38. The replacement insert may be obtained by withdrawing the carrier 18 to the outer position 18''' thereof at which the opening 38 is exposed at shelf 13 of the housing 12.

It is advantageous, from the standpoint of avoiding jamming and unnecessary movement of the insert 21 during travel of the carrier 18, to shape the carrier opening 38 so that the insert is contacted at the sides thereof by the carrier at points near the center of gravity of the insert. In this embodiment, the rectangular inserts are carried in the magazine 22 with the sides of the inserts inclined 45° with respect to the direction of travel of the carrier 18. As best shown in FIG. 4, the opening 38 in the carrier which receives the inserts 21 has a square configuration at the forward end and a triangular outline at the rearward end. Thus, as best shown in FIG. 2, the carrier 18 contacts an insert 21 in opening 38 only at opposite corners 39 of the insert at points lying along a line passing through the center thereof. Where articles other than the rectangular inserts 21 are to be dispensed, the opening 38 may have other appropriate configurations to achieve a similar relationship between the carrier 18 and the article.

Referring now to FIGS. 1 and 3 in conjunction, an important aspect of the invention is the providing of mechanism which prevents the carrier 18 from being operated to dispense an insert 21 as described above except when a used insert 21' is returned. A detent pin 41 is situated in a vertical guide cylinder 42 below carrier 18 forward from magazine 22 and on the opposite side of housing 12 therefrom. A compression spring 43 within guide 42 urges the pin 41 upward towards carrier 18. As best shown in FIG. 4, a detent opening 44 is provided in the carrier 18 in position to pass over the pin 41 during inward movement of the carrier prior to the point at which carrier opening 38 is registered with magazine 22. If the opening 44 is empty, the top of detent pin 41 will enter such opening and block further inward movement of the carrier 18. Thus a replacement insert 21 cannot be obtained from magazine 22 by manipulation of carrier 18 if the opening 44 is empty.

Opening 44 is exposed at the stepped surface 13 of the housing 12 when the carrier 18 is at its outer position 18''' and is shaped to receive a returnable used insert 21'. With a used insert 21' in opening 44 the carrier may be moved to its inner position 18' inasmuch as the insert prevents the detent pin 41 from entering the opening.

Referring again to FIG. 1, a passage 46 through shelf 14 allows the used insert 21' to drop from opening 44 into tray 32 when the carrier 18 is at its inner position 18' to receive a replacement insert 21 from magazine 22. Thus the mechanism in effect exchanges a replacement insert 21 for a used insert 21'.

To avoid interference with the outward movement of carrier 18 by detent pin 41, the rearward portion 47 of the top of the pin as well as the rear wall 48 of opening 44 are inclined. Wall 48 thus depresses the pin 41 as the carrier 18 is moved forward to release the replacement insert 21.

In operation, carrier 18 must first be unlocked by a key 49 specific to lock 34. This key 49 may be kept in the possession of a designated supervisory individual, such as the line foreman for example. After lock 34 has been released, carrier 18 may be moved to its outer position 18''' exposing opening 44 at shelf 13. A returnable insert 21' is then placed in opening 44 which enables the carrier 18 to be moved to its inner position 18' as the insert prevents blocking of such movement by detent 41. At the inner position 18' of the carrier 18 a replacement insert 21 from magazine 22 enters carrier opening 38 while the returned insert 21' drops through passage 46 to tray 32. The carrier 18 may then be withdrawn to the outer position 18''' at which the replacement insert 21 is obtainable from opening 38. Subsequently, the carrier 18 is returned to its intermediate position 18'' and locked thereat by means of key 49.

Reloading of magazine 22 is accomplished through door 26 which can only be opened with a key 51. At such time the returned inserts 21' are removed from tray 32 by releasing lock 33 with a key 52.

While the invention has been described with reference to the dispensing of tool inserts 21, it will be apparent that it may readily be adapted to exchanging any of a variety of articles and that the structure may take a variety of forms without departing from the substance of the invention.

What is claimed is:

1. An exchanging dispenser for articles which releases a replacement article only when an identical article is returned comprising a housing having a magazine therein for storing and sequentially releasing said replacement articles, a yieldable detent in said housing having a first position blocking release of said replacement articles from said housing and having a second retracted position at which one of said replacement articles is releasable therefrom, and an article carrier extending into said housing and having a first opening shaped for receiving said returnable one of said identical articles, said carrier being movable to carry said returnable article against said detent to move said detent to said second position thereof whereby said replacement one of said identical articles is obtainable from said housing.

2. An exchanging dispenser for articles which releases an article only when a like article is returned comprising a housing having a magazine therein for storing and sequentially releasing said articles, a yieldable detent in said housing having a first position blocking release of said articles from said housing and having a second retracted position at which one of said articles is releasable therefrom, and an article carrier extending into said housing and having a first opening for receiving a returnable one of said articles, said carrier being movable to carry said returnable article against said detent to move said detent to said second position thereof whereby a replacement one of said articles is obtainable from said housing wherein said article carrier is a plate having an end projecting from said housing, said plate being slidable by manipulation of said projecting end between an inner position and an outer position, said carrier plate having a second opening which registers with said magazine to receive a replacement article therefrom when said plate is at said inner position and which is exposed outside said housing for removal of said replacement article when said plate is at said outer position thereof, said first opening of said carrier plate and said detent being positioned to block movement of said carrier plate to said inner position thereof in the absence of said returnable article in said first opening, and wherein said second opening of said carrier has a configuration in which edges of said second opening drivingly contact said replacement article therein only at opposite points thereon on a line extending through the center of gravity thereof and normal to the direction of movement of said carrier.

3. An exchanging dispenser for articles as defined in claim 2 wherein said articles are rectangular and stored in said magazine with a diagonal thereof aligned with the direction of travel of said carrier, and wherein said second opening of said carrier has a progressively narrowing configuration at the end most remote from said projecting end of said carrier whereby said carrier contacts only opposite corners of said replacement article in said second opening.

References Cited

UNITED STATES PATENTS

| | | | |
|---|---|---|---|
| 2,948,379 | 8/1960 | Hensley | 194—92 |
| 1,080,754 | 12/1913 | Foster | 194—93 |
| 2,346,004 | 4/1944 | Bocanegra | 194—93 |
| 2,875,924 | 3/1959 | Edwards | 194—93 X |

STANLEY H. TOLLBERG, *Primary Examiner.*